United States Patent
Schmidt et al.

(10) Patent No.: US 9,941,501 B2
(45) Date of Patent: Apr. 10, 2018

(54) APPARATUS FOR A BATTERY MODULE

(71) Applicant: Dr. Ing. h.c. F. Porsche Aktiengesellschaft, Stuttgart (DE)

(72) Inventors: Tim Schmidt, Ludwigsburg (DE); Thierry Mingers, Sospel (FR); Dominik Grass, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 394 days.

(21) Appl. No.: 14/739,468

(22) Filed: Jun. 15, 2015

(65) Prior Publication Data

US 2015/0372280 A1    Dec. 24, 2015

(30) Foreign Application Priority Data

Jun. 18, 2014  (DE) .................. 10 2014 108 573

(51) Int. Cl.
*H01M 2/20*  (2006.01)
*H01M 2/10*  (2006.01)
*H01M 10/48*  (2006.01)

(52) U.S. Cl.
CPC ......... *H01M 2/206* (2013.01); *H01M 2/1077* (2013.01); *H01M 10/486* (2013.01); *H01M 10/482* (2013.01); *H01M 2220/20* (2013.01)

(58) Field of Classification Search
None
See application file for complete search history.

(56) References Cited

U.S. PATENT DOCUMENTS

| | | |
|---|---|---|
| 2005/0110458 A1* | 5/2005 | Seman, Jr. ............ H01M 2/204 320/114 |
| 2010/0195696 A1 | 8/2010 | Ishikawa et al. |
| 2011/0091749 A1 | 4/2011 | Chow |
| 2011/0151315 A1 | 6/2011 | Masson et al. |
| 2012/0028083 A1 | 2/2012 | Jung |
| 2012/0121939 A1 | 5/2012 | Yoo |
| 2013/0004811 A1 | 1/2013 | Banerjee et al. |

FOREIGN PATENT DOCUMENTS

| | | |
|---|---|---|
| EP | 2 398 108 | 12/2011 |
| WO | 2012/022438 | 2/2012 |
| WO | 2013/134808 | 9/2013 |

OTHER PUBLICATIONS

German Search Report dated Feb. 13, 2015.

* cited by examiner

*Primary Examiner* — Rena D Cronin
(74) *Attorney, Agent, or Firm* — Gerald E. Hespos; Michael J. Porco; Matthew T. Hespos

(57) ABSTRACT

A battery module (4) has a large number of battery cells (6). Each battery cell (6) has a contact section (10) with a positive pole (14) and a negative pole (12) on an outer wall of the battery cell (6). An apparatus (20) for the battery module (4) has a terminal sheet (22) and a flat body (24) made of an electrically insulating material. The flat body (24) is between the terminal sheet (22) and the battery cells (6) and has holes (26) registered with the positive poles (14). Contact elements (30) extend from the terminal sheet (22) through the holes (26) in the flat body (24) and electrically connect the terminal sheet (22) to the positive poles (14).

16 Claims, 3 Drawing Sheets

APPARATUS FOR A BATTERY MODULE

CROSS REFERENCE TO RELATED APPLICATION

This application claims priority under 35 USC 119 to German Patent Appl. No. 10 2014 108 573.6 filed on Jun. 18, 2014, the entire disclosure of which is incorporated herein by reference.

BACKGROUND

1. Field of the Invention

The invention relates to an apparatus for a battery module, and also to a battery arrangement.

2. Description of the Related Art

A large number of battery cells can be associated with a mobile technical device, such as a motor vehicle, to supply electrical energy to the mobile technical device. In this case, the positive poles of all of the batteries are to be connected to one another and to an energy module for tapping off the electrical energy. However, connecting lines that are provided for this purpose and by means of which the energy module is connected to the positive poles are to be disconnected from negative poles of the battery. Furthermore, provision may be made to tap off an operating parameter from each battery cell. In this case, a corresponding sensor is to be associated with each battery cell.

WO 2012/022438 A1 discloses a rewiring element for an energy storage module that comprises storage cells arranged one above the other in at least one vertical row and electrically connected to one another in pairs by cell connectors. The rewiring element comprises a support plate with conductor tracks formed from layers on the support plate and an insulation layer applied to the support plate at least in sections.

US 2013/0004811 A1 discloses a sensor arrangement for measuring a temperature of a battery. This sensor arrangement comprises sensor elements integrated into a casing of an outer wall of the battery.

US 2011/0151315 A1 discloses a busbar arrangement for a plurality of batteries. This busbar arrangement has a substrate made of an electrically insulating material and electrically conductive sections are arranged on the substrate. Contacts to be connected to the batteries can be made by the electrically conductive sections.

US 2012/0121939 A1, US 2012/0028083 A1 and US 2010/0195696 A1 disclose further devices with which electrical energy from batteries can be provided and temperatures of the batteries can be measured.

Against this background, an object of the invention is to connect battery cells of a battery module to a consumer of electrical energy, wherein the battery cells are to be separated reliably from one another and opposite poles of the battery modules are to be separated reliably from one another.

SUMMARY OF THE INVENTION

The invention relates to an apparatus for a battery module that has a large number of battery cells. Each battery cell has a positive pole and a negative pole on a contact section of an outer wall. In addition, the contact sections of all of the battery cells of the battery module are oriented in the same direction. The battery cells of the battery module are disposed to provide a specific arrangement of the positive poles. The apparatus has a common terminal sheet for all of the battery cells and a common flat body that is made of an electrically insulating material. The flat body is arranged between the terminal sheet and the contact sections of the battery cells. Additionally, the flat body and the terminal sheet have holes that register respectively with the positive poles of the battery module. The terminal sheet comprises a large number of contact elements arranged so that in each case one contact element of the terminal sheet is associated with a positive pole of a battery cell. Each contact element is to be connected to a positive pole of a battery cell through in each case one hole in the flat body, and each negative pole of a battery cell is to be insulated from the terminal sheet by the flat body.

The common flat body may be film-like and/or elastically deformable and may be formed from at least one polyimide compound that comprises polyimide groups. Polyimide compounds are produced, for example, by DuPont and commercially available under the name Kapton.

A surface of the common flat body that is to be associated with the contact sections may have a large number of temperature sensors arranged in line with a defined arrangement of the contact sections and/or of the positive poles of the battery module. Each temperature sensor may be associated with a contact section of a battery cell, such as a negative pole, and may be fastened thereto. Thus, each temperature sensor can make contact with a battery cell, such as a negative pole of the battery cell, to detect the temperature thereof. Furthermore, the temperature sensors can be soldered or otherwise fastened onto the surface of the flat body. The temperature sensors can be connected to a monitoring unit for the battery module by conductor tracks.

The flat body may be fixed on the battery module, and in each case one battery cell may be fastened to the flat body, for example by an adhesive.

The apparatus is provided for a battery module in which the battery cells are arranged next to one another along at least one row to define the arrangement of the positive poles and/or the contact sections of the battery cells. Accordingly, the battery module can have at least two rows of battery cells arranged next to one another, and the battery cells may be arranged next to one another in each row. In one refinement, the battery module comprises at least three battery cells that can be arranged in at least one row with one another, and the positive poles of the battery cells are to be connected to one another by the common terminal sheet.

The common terminal sheet can comprise a large number of holes that are arranged next to one another in line with the defined arrangement of the positive poles of the battery module. Each contact element of the terminal sheet is associated with a hole in the terminal sheet.

At least one contact element of the terminal sheet can be part of the terminal sheet and accordingly can be formed integrally with the terminal sheet. All of the contact elements can be integral with the terminal sheet. Alternatively, the contact element can be connected to the terminal sheet as an additional part.

The terminal sheet may be formed integrally from an electrically conductive material, such as metal. Accordingly, the terminal sheet may comprise a continuous unitary blank formed from metal, for example, by casting, mechanical shaping and/or processing. In this case, the terminal sheet can be produced solely by casting. An integral or unitary blank of this kind can be processed, for example, by stamping, cutting, hammering, drilling and/or machining measures. For example, the holes can be drilled and/or the contact elements can be shaped. If at least one contact element is in the form of an additional part, this additional part is to be connected to the integral terminal sheet during production of the apparatus, for example, by riveting, welding and/or soldering.

The battery arrangement of the invention may comprise the battery module and an embodiment of the above-described apparatus of the invention provided for at least three battery cells of a battery module.

The battery arrangement comprises the battery module, the terminal sheet and the flat body that is flexible and also electrically insulating. The battery module may comprise a large number of battery cells that are to be connected electrically to one another to generate a desired output voltage for a consumer, and also are to be connected to the consumer. The battery cells are monitored by temperature sensors and voltage taps during operation of the battery arrangement.

The positive poles of all of the battery cells of the battery module can be connected electrically by the common metal terminal sheet. The terminal sheet may be situated on the flat body and may be insulated electrically from the negative poles of all of the battery cells by the flat body. The temperature sensors may be arranged on the flat body in line with a specified arrangement of the negative poles of the battery module and usually are soldered onto the flat body. After positioning the flat body onto the battery cells, in each case one temperature sensor is to be positioned exactly on one battery cell. Each individual temperature sensor has an electrical connection in the form of a conductor track. All of the conductor tracks run along the surface of the flat body and end at a tap, such as a lug. The tap is in electrical contact with the monitoring unit for the battery module.

The abovementioned features can be used both in the respectively indicated combination, and also in other combinations or on their own, without departing from the scope of the invention.

DETAILED DESCRIPTION OF THE PREFERRED EMBODIMENTS

Figure 1A:
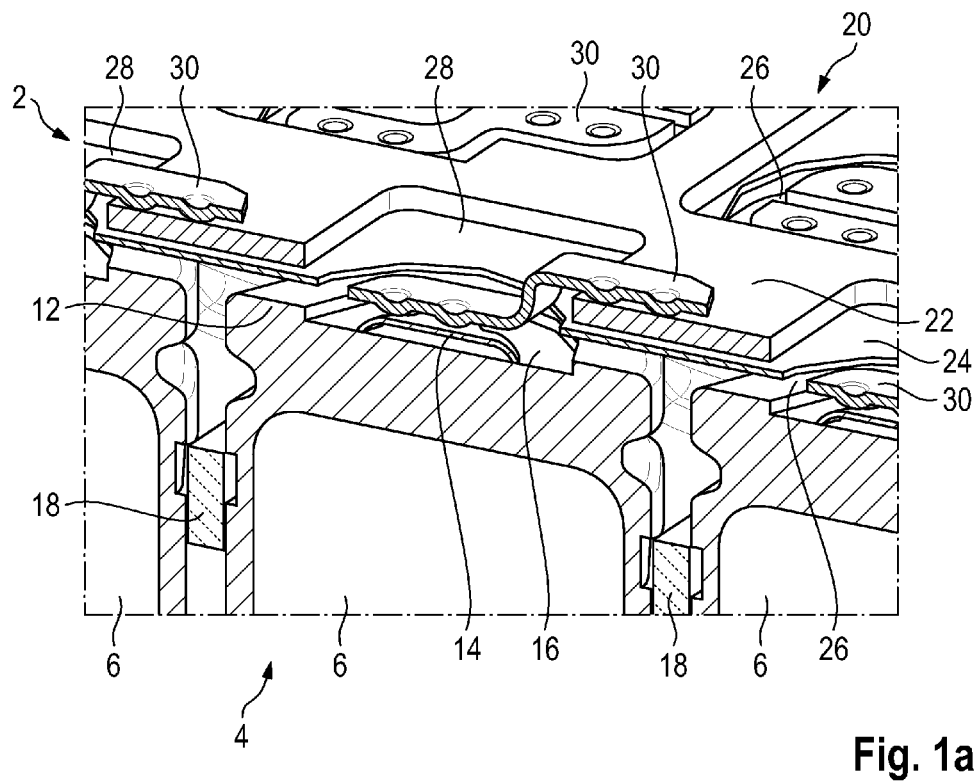
FIGS. 1a and 1b are schematic illustrations of a first detail of an embodiment of a battery arrangement of the invention, a first detail of an embodiment of an apparatus of the invention, and also an example of a battery cell.

The invention is illustrated schematically in the drawings on the basis of embodiments and will be described in detail with reference to the drawings. The same reference numerals are associated with identical components throughout the figures.

FIG. 1a illustrates an embodiment of a battery arrangement 2 according to the invention and comprises a battery module 4 with a plurality of battery cells 6. However, only three of the battery cells being is illustrated in FIG. 1a however.

Figure 1B:
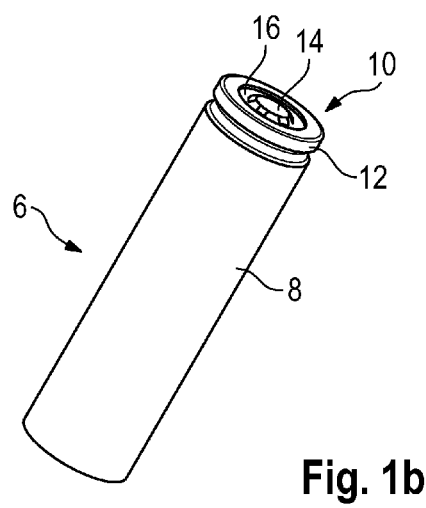

FIG. 1b schematically illustrates one of the battery cells 6 independently of the battery arrangement 2 of FIG. 1a. The battery cell 6 has an outer wall or a housing with a cylindrical casing 8 and a contact section 10. The casing 8 forms a negative pole 12 of the battery cell 6. The center of the circular contact section 10 of each battery cell 6 has a positive pole 14 that is surrounded coaxially by the negative pole 12, which is formed in an annular manner at the contact section 10. The positive pole 14 and the negative pole 12 are separated from one another and therefore are insulated electrically from one another by an insulating region 16 at the contact section 10.

A plurality of battery cells 6 are arranged next to one another in a row in the battery module 4. The battery module 4 further comprises a plurality of rows of battery cells 6 that are arranged next to one another. The casings 8 of adjacent battery cells 6 are insulated electrically from one another by insulating modules 18. The contact sections 10 and therefore also the positive poles 14 of the battery cells 6 are oriented in the same direction.

The battery arrangement 2 further comprises an apparatus 20 with a terminal sheet 22 and a flat body 24. The terminal sheet 22 is formed from an electrically conductive metal and is common to all of the battery cells 6. The flat body 24 also is common to all of the battery cells 6 and is composed of an electrically insulating material, such as a polyimide compound.

This flat body 24 comprises a large number of holes 26 arranged in line with an arrangement of the positive poles 14 of the battery cells 6 of the battery module 4. The terminal sheet 22 also has a large number of holes 28 that also are arranged in line with the arrangement of the positive poles of the battery cells 6 of the battery module 4. The electrically insulating flat body 24 is situated on the negative poles 12 of all of the battery cells 6. Therefore, only the positive poles 14 of the battery cells 6 are accessible from the outside or from the top through the holes 26, whereas the negative poles 12 of the battery cells 6 are covered completely by the flat body 24. The holes 26 in the common flat body 24 can have diameters smaller than an inside diameter of each negative pole 12 that is formed in an annular manner on the contact section 10.

The terminal sheet 22 is situated on the flat body 24. Therefore, the flat body 24 separates the terminal sheet 22 from the negative poles 12 of the battery cells 6 and electrically insulates the terminal sheet 22 from the negative poles. The holes 28 in the terminal sheet 22 register respectively with the positive poles 14 and with the holes 26 in the flat body 24. Contact elements 30 are fastened to edges of the holes 28 in the terminal sheet 22 and connect the positive poles 14 electrically conductively to the terminal sheet. More particularly, each contact element 30 is routed through a respective hole 26 in the flat body 24 and onto the respective positive pole 14.

Figure 2:
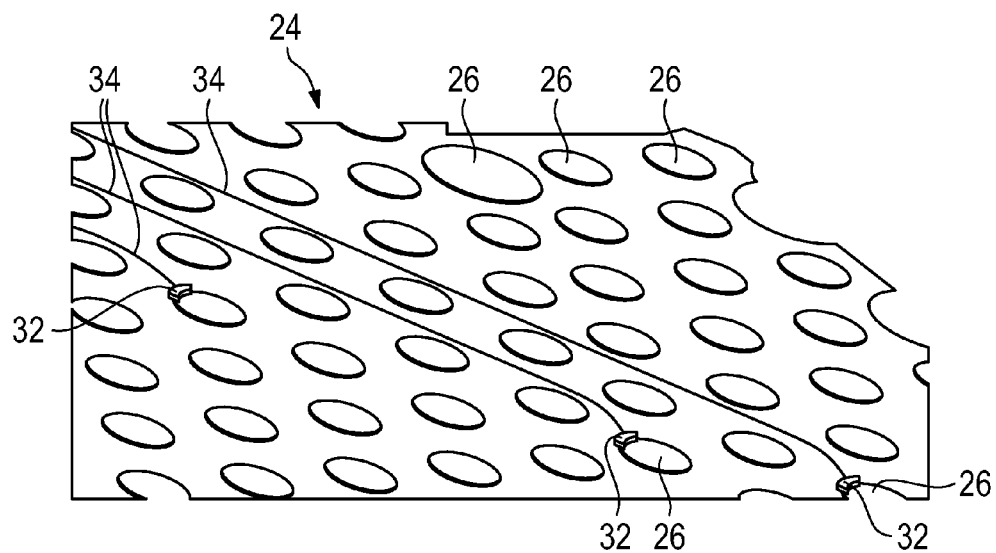
FIG. 2 is a schematic illustration of a second detail of the embodiment of the battery arrangement according and also of the apparatus of the invention.

The electrically insulative common flat body 24 is provided for all of the battery cells 6 and is illustrated schematically in FIG. 2 independent of other components of the battery arrangement 2 and the apparatus 20. FIG. 2 also shows temperature sensors 32 arranged on the edge of the holes 26 in the flat body 24. The temperature sensors 32 are connected to a monitoring unit for the battery module 4 by conductor tracks 34 that are fit on the flat body 24. In addition, at least one voltage tap is provided for each terminal sheet 22 to supply power to the monitoring unit so that the battery cells 6 can be monitored by the monitoring unit. To this end, a conductor track is fit on the flat body 24 to connect the voltage tap electrically to the monitoring unit.

Figure 3:
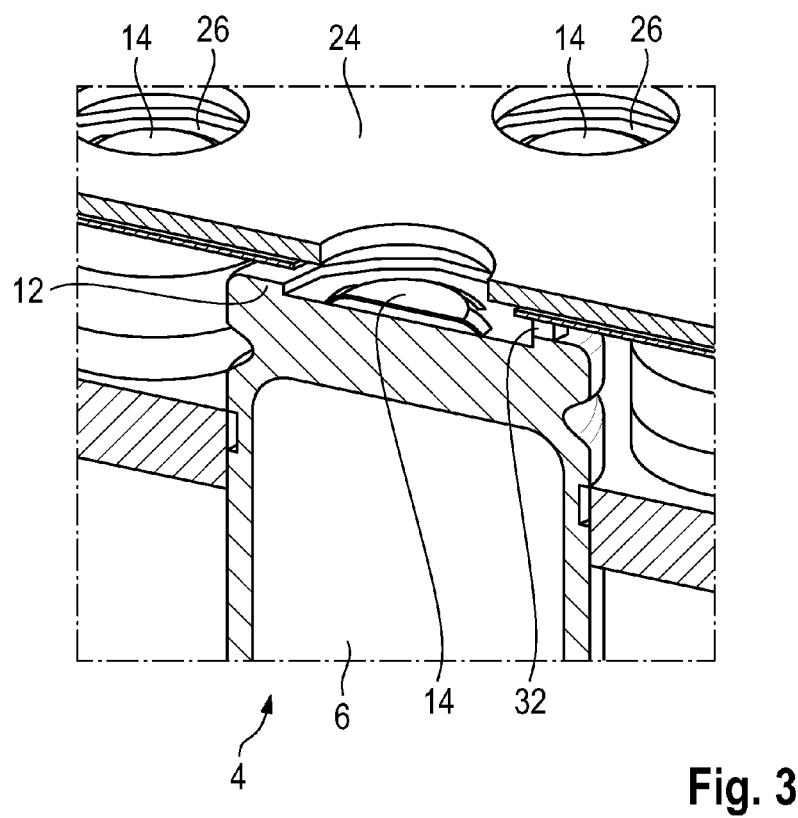
FIG. 3 is a schematic illustration of a third detail of the embodiment of the battery arrangement and the apparatus of the invention.

FIG. 3 schematically shows positive poles 14 of some battery cells 6 of the battery module and also holes 26 in the flat body 24 that register respectively with the positive poles 14 and therefore are associated with the positive poles 14. FIG. 3 also shows how a temperature sensor 32 associated with a contact section 10, here a negative pole 12 of a battery cell 6, on the flat body 24. The flat body 24, which is composed of the polyimide compound and has the temperature sensors 32 soldered thereon, is to be fixed on the preassembled battery module 4, for example by adhesive, at a position to align with the arrangement of the positive poles 14. Therefore, all of the temperature sensors 32 can be positioned exactly on the contact sections 10 and/or on the negative poles 12 of the battery cells 6 and fastened thereto.

Figure 4:
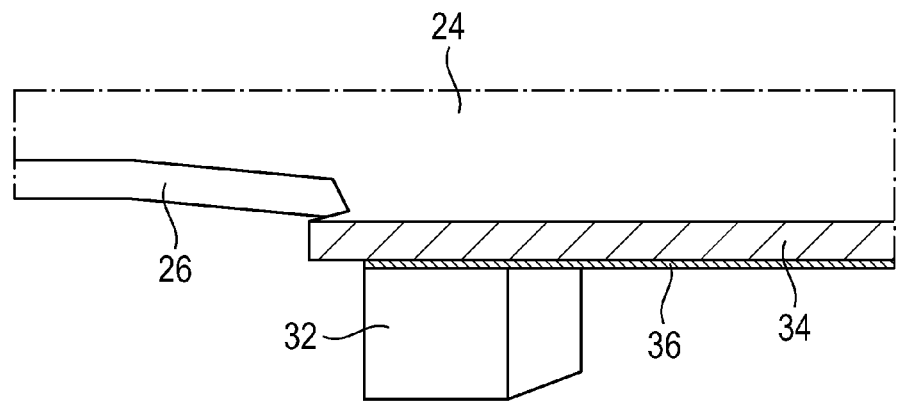
FIG. 4 is a schematic illustration of a fourth detail of the embodiment of the battery arrangement and also of the apparatus of the invention.

FIG. 4 shows how a temperature sensor 32 is arranged on the edge of a hole 26 in a surface of the flat body 24 that is to be associated with the contact sections 10. A conductor track 36, which the temperature sensor 32 is to be connected to the monitoring unit, is fit on the flat body 24, covered by an insulation layer 34 and insulated on all sides.

Figure 5:
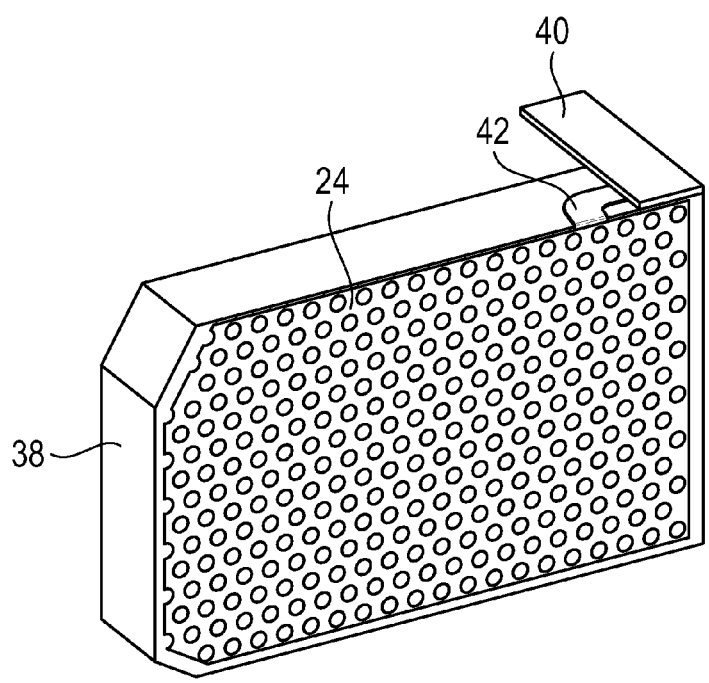
FIG. 5 is a schematic illustration of a fifth detail of the embodiment of the battery arrangement and also of the apparatus of the invention.

FIG. 5 schematically illustrates from a battery housing 38 within which all of the battery cells 6 of the battery module 4 are arranged. In this case, an arrangement of the positive poles 14 of the battery cells 6 is defined due to a shape of a base surface of the battery housing 38. FIG. 5 also shows the flat body 24 situated on the contact sections 10 of the battery cells 6, the holes 26 in the flat body and also the positive poles 14 of the battery cells 6 which are visible through the holes 26 also being shown here.

FIG. 5 further shows the monitoring unit 40 for the battery module 4 fastened on the battery housing 38.

The flat body 24 is to be placed, positioned and fixed on the preassembled battery module 4 so that the temperature sensors 32 are positioned exactly on the contact sections 10 of the battery cells 6. A connecting element 42 connects the flat body 24 to the monitoring unit 40 after the flat body 24 is placed and fastened on the contact sections 10 of the battery cells 6 and therefore on the battery module 4. As a result, all of the conductor tracks 34 of all of the temperature sensors 32 connected to the common connecting element 42 are to be connected to the monitoring unit 40 at the same time.

In addition, the terminal sheet 22 then is placed on the flat body 24 so that the contact elements 30 of the terminal sheet 22 are routed through the holes 26 in the flat body 24 and connected to the positive poles 14 of the battery cells 6. The arrangement of the contact elements 30 and the holes 26 is correlated with the arrangement of the positive poles 14. Additionally, the diameter of each hole 26 in the flat body 24 is smaller than an inside diameter of each negative pole 12. Thus, in each case one contact element 30 is connected solely to one positive pole 14 of a battery cell 6 and electrically insulated from the negative pole 12 of the same battery cell 6.

What is claimed is:

1. An apparatus for a battery module that has battery cells, each of the battery cells having a contact section with a positive pole and a negative pole on an outer wall, the apparatus comprising:
    a flat body made of an electrically insulating material and disposed on contact sections of the battery cells and covering the negative poles, the flat body having holes registered respectively with the positive poles;
    a terminal sheet on a surface of the flat body opposite the battery cells and made of a unitary sheet of a conductive material, the terminal sheet having holes registered respectively with the positive poles; and
    contact elements provided respectively for each of the battery cells and extending through the respective holes in the flat body and in the terminal sheet, each of the contact elements having an outer end connected to a surface of the terminal sheet opposite the flat body and having an inner end connected to the respective positive pole, wherein the flat body insulates the terminal sheet and the contact elements from the negative poles.

2. The apparatus of claim 1, wherein the flat body is formed from at least one polyimide compound.

3. The apparatus of claim 1, wherein the battery cells include a first battery cell, and the apparatus further comprising a temperature sensors on a surface of the flat body opposite the terminal sheet, the temperature sensors being disposed in proximity to the contact section of the first battery cell of the battery module.

4. The apparatus as claimed in claim 3, wherein the temperature sensor is secured onto the surface of the flat body.

5. The apparatus of claim 3, further comprising a monitoring unit and a conductor tracks connecting the temperature sensor to the monitoring unit.

6. The apparatus of claim 1, wherein the flat body is fixed on the battery module.

7. The apparatus of claim 1, wherein the battery cells of the battery module are arranged next to one another along at least one row.

8. The apparatus of claim 7, wherein the at least one row comprises a plurality of rows of the battery cells arranged next to one another and the battery cells in each of the rows being arranged next to one another.

9. The apparatus of claim 1, wherein at least one of the contact elements is formed integrally with the terminal sheet.

10. The apparatus of claim 1, wherein at least one of the contact elements is formed separately from the terminal sheet.

11. A battery arrangement comprising:
    a battery module having a plurality of battery cells, each the battery cells having a contact section with a positive pole and a negative pole on an outer wall of the respective battery cell, the battery cells being oriented so that the contact sections face in a common direction;
    a flat body made of an electrically insulating material and disposed on contact sections of the battery cells and covering the negative poles, the flat body having holes registered respectively with the positive poles;
    a terminal sheet on a surface of the flat body opposite the battery cells and made of a unitary sheet of a conductive material, the terminal sheet having holes registered respectively with the positive poles; and
    contact elements provided respectively for each of the battery cells and extending through the respective holes in the flat body and in the terminal sheet, each of the contact elements having an outer end connected to a surface of the terminal sheet opposite the flat body and having an inner end connected to the respective positive poles, wherein the flat body insulates the terminal sheet and the contact elements from the negative poles.

12. The battery arrangement of claim 11, wherein the battery cells of the battery module are arranged next to one another along at least one row.

13. The battery arrangement of claim 12, wherein the at least one row comprises a plurality of rows of the battery cells arranged next to one another and the battery cells in each of the rows being arranged next to one another.

14. The battery arrangement of claim 13, wherein the battery cells include a first battery cell, and the battery arrangement further comprising a temperature sensor on a surface of the flat body opposite the terminal sheet, the temperature sensors being disposed in proximity to the contact section of the first battery cell of the battery module.

15. The battery arrangement of claim 14, further comprising a monitoring unit and a conductor tracks connecting the temperature sensor to the monitoring unit.

16. The battery arrangement of claim 11, wherein at least one of the contact elements is formed separately from the terminal sheet.

* * * * *